US006872263B1

United States Patent
Jansen et al.

(10) Patent No.: US 6,872,263 B1
(45) Date of Patent: *Mar. 29, 2005

(54) CLEANING SYSTEM AND METHOD FOR DYNAMIC DEVICES IN A REFINERY

(75) Inventors: Bruce Robert Jansen, Wichita, KS (US); Sean Edward Sears, Wichita, KS (US)

(73) Assignee: Refined Technologies, Inc., Wichita, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 10/781,275

(22) Filed: Feb. 18, 2004

(51) Int. Cl.[7] .................................................. B08B 9/00
(52) U.S. Cl. .................. 134/31; 134/19; 134/22.1; 134/22.11; 134/22.12; 134/22.14; 134/22.15; 134/22.18; 134/22.19; 134/26; 134/27; 134/30; 134/34; 134/35; 134/36; 134/37
(58) Field of Search .................. 134/19, 22.1, 22.11, 134/22.12, 22.14, 22.15, 22.18, 22.19, 26, 27, 30, 31, 34–37

(56) References Cited

U.S. PATENT DOCUMENTS

| | | | | |
|---|---|---|---|---|
| 3,084,076 A | * | 4/1963 | Loucks et al. ............. 134/22.1 |
| 4,464,189 A | * | 8/1984 | Tedder ....................... 62/628 |
| 5,356,482 A | | 10/1994 | Mehta et al. | |
| 5,389,156 A | * | 2/1995 | Mehta et al. ................. 134/10 |
| 5,425,814 A | | 6/1995 | Krajicek et al. | |
| 6,017,492 A | * | 1/2000 | Hashimoto ................... 422/27 |
| 6,283,133 B1 | | 9/2001 | Furuta et al. | |
| 2004/0102351 A1 | * | 5/2004 | Jansen et al. ................ 510/407 |

* cited by examiner

*Primary Examiner*—Sharidan Carrillo
(74) *Attorney, Agent, or Firm*—Shook, Hardy & Bacon L.L.P.

(57) ABSTRACT

Disclosed is a novel process for interior cleaning and by cleaning, removing noxious gas and/or restoring the operating efficiency of organically contaminated hydrocarbon processing dynamic devices in a safe and effective manner and in a very short period of time, without a need to manually enter an unsafe environment and mechanically remove organic contaminants. Used is a formulation of non-aqueous, monocyclic saturated terpene mixed with a non-ionic surfactant package. The terpene-based chemical is injected into the organically contaminated device using a novel process involving high-pressure steam to form a very effective cleaning vapor. The device is activated during the process. The vapor may be optionally directed against the normal-flow direction of the device.

15 Claims, 2 Drawing Sheets

CLEANING SYSTEM AND METHOD FOR DYNAMIC DEVICES IN A REFINERY

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

This invention relates to the field of processes for cleaning refinery equipment. More specifically, the invention relates to the field of cleaning the internal surfaces of dynamic devices in refineries, such as centrifugal pumps and control valves and other like devices.

After a period of use of a pump or control valve in a refinery, contaminants may develop on its moving and other parts. This impedes performance. In order to maintain performance at an acceptable level, these contaminants must be removed.

The contaminants removed would include any hydrocarbon that is found in crude oil. These hydrocarbons will vary in size, length, molecular weight and structure. The industry refers to these different structures as Light End, Medium and Heavy. Light Ends would be cuts like methane, propane, and ethane. Medium cuts would include kerosene, gasoline, and diesel, among others. Heavy cuts would include lubricants, waxes and asphalt.

The conventional method for cleaning dynamic devices involves complete disassembly of the dynamic device followed by manual cleaning. Where this device is centrifugal pump, this involves turning off the power, isolating the pump from the process stream, opening the casing, removing the impeller and all the other individual parts, and then manually cleaning each of the contaminated parts (o-rings, seals, separator plate, motor adaptor, rotating element, etc.) individually. The disassembly and cleaning steps are extremely labor intensive, expensive, and require a long shut-down period. Once everything has been cleaned, the user must then reassemble. This also takes a considerable amount of time.

The present invention overcomes these disadvantages by introducing a cleaning agent into the device using steam. The steam volatilizes the cleaning agent and quickly dissolves the organic residues from inside the dynamic device. During the cleaning process, the device is temporarily activated. This has been shown to improve the cleaning process. The cleaning agent used is comprised of terpene and surfactant.

SUMMARY OF THE INVENTION

The present invention is a method of cleaning a dynamic device in a refinery or elsewhere. The method comprises the steps of (i) providing a steam source; (ii) providing a surfactant source; (iii) providing an organic solvent source; (iv) delivering steam from said steam source to the device; (v) introducing the organic solvent from the organic solvent source into the steam delivered; (vi) introducing a surfactant from said surfactant source into the steam delivered; (vii) removing vaporous effluent from said vessel while the steam, organic solvent, and surfactant are being delivered; (viii) activating the device while the cleaner is being administered, and (iv) returning the device to service after the cleaning process is completed.

More specifically, the process involves isolating the device to be cleaned by blocking (or blinding) it in, using an administrator to inject a cleaner comprising a terpene and a surfactant into high-pressure steam, and introducing the steam and chemistry mixture into the device. The device should be temporarily activated during the cleaning process. This helps with the removal of contaminants.

The equipment used to introduce the cleaner includes a barrel pump or steam siphon, a T-fitting and at least one injection nozzle. These components are needed to vaporize and accurately control the volumetric ratios of chemical vapor and steam. The cleaner injected into the steam ideally includes a formulation including a monocyclic saturated terpene mixed with a non-ionic surfactant package.

The process may be used to clean pumps, valves, or other dynamic devices.

BRIEF DESCRIPTION OF THE DRAWINGS

The present invention is described in detail below with reference to the attached drawing figures, wherein.

DETAILED DESCRIPTION OF THE INVENTION

Figure 1:
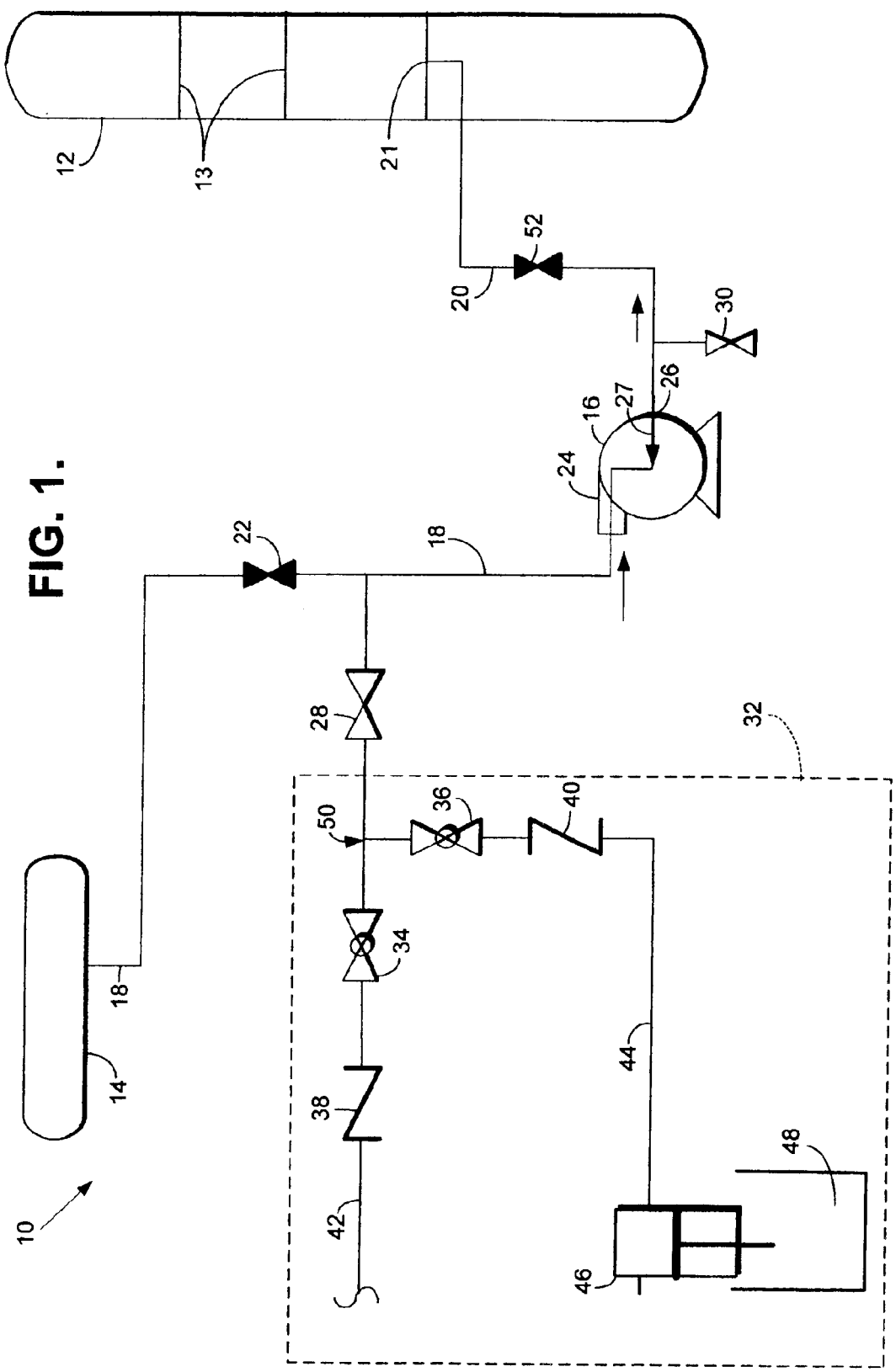
FIG. 1 is a schematic diagram showing the implementation of the present invention in a typical refinery arrangement including a dynamic device.

The present invention solves the problems present in the prior art methods.

Less cost and more regular cleaning is possible because the present invention enables dynamic devices to be cleaned much more quickly than with the prior art methods which require disassembly and manual cleaning. Also, because the equipment is cleaned much more quickly, the refinery is able to boost efficiency by minimizing downtime.

The combination of a unique cleaning agent and the process by which it is used makes this cleaning method fast and effective. It may be used to clean any dynamic device that can be isolated and then accessed by steam.

The build up of contaminants may cause problems in dynamic devices over time. The identification of a problem may occur in many different ways. Where the device is a piece of rotating equipment, such as a pump, problems can be detected by performing vibration analysis. This process involves monitoring vibration levels of rotating equipment in an effort to predict device failure and to avoid unexpected equipment outages. This is done by setting acceptable vibration level limits. When vibration levels exceed predetermined levels, the operator of the refinery knows that maintenance needs to be done on the device. Other indicators of contaminant-caused problems are realized when the device becomes obstructed or clogged, where there is insufficient suction head, or where the device has become inoperable.

The process of the present invention may also be used for the purpose of identifying air leaks in equipment. Once contaminants are removed, it will likely exacerbate the leak, thus making it easier to identify the origin of the air loss (e.g., a gasket or o-ring). Once the leaking part (e.g., gasket or o-ring) has been identified, it is known which part must be replaced.

Where the dynamic device is a control valve, a contaminant-caused problem may be evidenced by an inability to control the process fluid flow. The valve may also be found to stick. It also may be found to not close all the way. In such circumstances, the processes of the present invention may be used to overcome the performance dilemma caused by fouling by removing the contaminants.

Once a particular contaminant-caused problem with a dynamic device has been detected, it is a desirable time to begin the cleaning process.

The method of the present invention uses a naturally occurring organic solvent as a cleaning agent. The cleaning agent is injected directly into one or more high-pressure steam lines already present in the refinery's system. The cleaning agent and stream mix as vaporized and allowed to enter into the dynamic equipment whereupon it cleans all surfaces inside the equipment in a very short period of time.

The cleaning agent used has two ingredients. The first is a terpene. The term "terpenes" is traditionally applied to cyclic hydrocarbons having structures with empirical formula $C_{10}H_{16}$ which occur in the essential oils of plants. Knowledge of the chemistry of the terpene field has developed and compounds related both chemically and biogenetically to the $C_{10}H_{16}$ carbons have been identified. Some natural products have been synthesized and other synthetic compounds resemble known terpene structures. Consequently, the term "terpenes" may now be understood to include not only the numerous $C_{10}H_{16}$ hydrocarbons but also their hydrogenated derivatives and other hydrocarbons possessing similar fundamental chemical structures. These hydrocarbons may be acyclic or cyclic, simple or complex, and of natural or synthetic origin. The cyclic terpene hydrocarbons may be classified as monocyclic, bicyclic, or tricyclic. Many of their carbon skeletons have been shown to consist of multiples of the isoprene nucleus, $C_5H_8$.

Generally, the terpene selected could be acyclic, bicyclic, or tricyclic. Examples of acyclic terpenes that might be used are geraniolene, myrcene, dihydromycene, ocimene, and allo-ocimene. Examples of monocyclic terpenes that might be used are p-menthane; carvomethene, methene, dihydroterpinolene; dihydrodipentene; α-terpinene; γ-terpinene; α-phellandrene; pseudolimonene; limonene; d-limonene; 1-limonene; d,1-limonene; isolimonene; terpinolene; isoterpinolene; β-phellandrene; β-terpinene; cyclogeraniolane; pyronane; α-cyclogeraniolene; β-cyclogeraniolene; y-cyclogeraniolene; methyl-γ-pyronene; 1-ethyl-5 5-dimethyl-1,3-cyclohexadiene; 2-ethyl-6,6-dimethyl-1,3-cyclohexadiene; 2-p-menthene 1(7)- ρ-methadiene; 3,8-ρ-menthene; 2.4- ρ-menthadiene; 2,5- ρ-menthadiene; 1(7), 4(8) ρ-methadiene; 3,8-ρ-menthadiene; 1,2,3,5-tetramethyl-1-3-cyclohexadiene; 1,2,4,6-tetramethyl-1,3-cyclohexadiene; 1,6,6-trimethylcyclohexene and 1,1-dimethylcyclohexane. Examples of bicyclic terpenes that might be used are norsabinane; northujene; 5-isopropylbicyclohex-2-ene; thujane; β-thujene; α-thujene; sabinene; 3,7-thujadiene; norcarane; 2-norcarene; 3-norcarene; 2-4-norcaradiene; carane; 2-carene; 3-carene; β-carene; nonpinane; 2-norpinene; apopinane; apopinene; orthodene; norpadiene; homopinene; pinane; 2-pinene; 3-pinene; β-pinene; verbenene; homoverbanene; 4-methylene-2-pinene; norcamphane; apocamphane; campane; α-fenchane; α-fenchene; sartenane; santane; norcamphene; camphenilane; fenchane; isocamphane; β-fenchane; camphene; β-fenchane; 2-norbornene; apobornylene; bornylene; 2,7,7-trimethyl-2-norbornene; santene; 1,2,3,-trimethyl-2-norbornene; isocamphodiene; camphenilene; isofenchene and 2,5,-trimethyl-2-norbornene.

The terpene normally used, and most preferred as the first ingredient in the cleaning agent of the present invention is a monocyclic saturated terpene that is rich in para-menthane ($C_{10}H_{20}$). Para-menthane has a molecular weight of 140.268. This active ingredient includes both the cis- and trans- isomers. Common and approved synonyms for para-menthane include: 1-methyl-4-(1-methylethyl)-cyclohexane and 1-isopropyl-4-methylcyclohexane. Para-menthane is all natural, readily biodegradable by EPA methods, and non-toxic by OSHA standards. Monocyclic saturated terpenes, however, are not the only compounds that may be used as the active ingredient of the cleaning agent. Other naturally occurring terpenes, such as (i) monocyclic unsaturated isoprenoids such as d-limonene ($C_{10}H_{16}$), (ii) bicyclic pine terpenes such as -pinene & -pinene, or (iii) any combination of monocyclic and bicyclic terpenes could also be used.

A second ingredient in the cleaning agent is an additive. The additive of the present invention is a nonionic surfactant package which enhances detergency, wetting, and rinsing. The first major constituent of the surfactant package includes a linear alcohol ethoxylate ($C_{12}$–$C_{15}$) with an ethoxylated propoxylated end cap. This linear alcohol ethoxylate greatly enhances the detergency or cleaning power of the cleaning agent formulation. Linear alcohol ethoxylates are also more environmentally friendly than more traditional surfactants. They exhibit good biodegradation and aquatic toxicity properties. Another major constituent of the cleaning agent surfactant package is a fatty alkanolamide primarily consisting of amides and tall oil fatty N,N-bis(hydroxyethyl) This fatty alkanolamide primarily aids in rinsing, oil solubility, and wetting. The combination in the proper ratios of these two classes of surfactants achieves the desired enhancements of the cleaning agent formulation. The following nonionic surfactants with an HLB range of 6.0–10.5 are also acceptable as an additive package which may include but are not limited to (i) nonylphenol polyethoxylates, (ii) straight chain linear alcohol ethoxylates, (iii) linear alcohol ethoxylates with block copolymers of ethylene and propylene oxide, (iv) oleamide DEA, or (v) diethanolamine. Of course, one skilled in the art would recognize that other additives could be used which would still fall within the scope of the invention.

Formulation of the cleaning agent of the present invention is effective at any of the following composition ranges by using a combination of the acceptable chemistries from above:

| Component | Range (by weight) |
| --- | --- |
| Terpene | 50%–95% |
| Additive Package | 5%–50% |

Formulation of the cleaning agent of the present invention has been found to be most effective when in the following ranges:

| Component | Range (by weight) |
| --- | --- |
| Terpene | 85%–88% |
| Additive Package | 12%–15% |

Calculating a ratio based on the percentages immediately above, we see that the ratio by weight of the additive surfactants to organic solvents (terpenes) of said cleaning agent should be between 0.136 and 0.176 in order to obtain the best results. It is, however, still within the scope of the invention to use ratios outside the 0.136–0.176 range. It is important to note that water is not present in any formulation of the present method. The absence of water is advantageous because water residue left in a production line may "flash" easily at standard production temperatures. Flashing occurs when water trapped in a production line hits hydrocarbon fluids which are at extremely elevated temperatures. Some processing fluids may have temperatures in excess of 600° F. When these hot fluids contact water, the rapid expansion of the water may be violently explosive. Damage to refinery hardware may result, and more importantly, workers may be at risk.

The cleaner of the present invention, however, does not risk flashing because it is all hydrocarbon. This eliminates the possibility of flashing.

The amount of cleaner provided for use in the process will depend on the size of the device to be cleaned. The total volume of a dynamic device may be calculated for these purposes by computing the informal volume of a box that will completely enclose the equipment to be cleaned.

Once total volume has been calculated, the preferred amount of cleaning agent to be injected into the vessel is computed using the ratio of one gallon of the cleaning agent per cubic foot of equipment volume. Satisfactory results may be obtained, however, using ratios as low as one gallon of cleaning agent per 0.25 ft$^3$ of vessel volume and as high as one gallon of cleaning agent per 0.25 ft$^3$ of vessel volume. However, if the amount of contamination is greater than typical, ratios well above one gallon per cubic foot of enclosed volume may be required.

The combination of the unique cleaning agent formulation is used according to the following procedures.

FIG. 1 helps illustrate how this procedure would be accomplished for a typical centrifugal pump in a refinery. Although centrifugal pump has been selected for demonstrative purposes here, this process works equally well for numerous other dynamic devices that may be found in a refinery. For example, Applicant's processes have been found to work equally well in cleaning control valves. Virtually any dynamic device in a refinery that can be isolated with steam and water may be cleaned using these same basic concepts. It is important to note that the term "dynamic device," as used in this application, is intended to mean simply a device that has moving parts or in some way dynamically acts on crude oil or other products in the production process. This terminology is not intended to limit the scope of the invention to any particular type of device. Though the vessel selected for illustrating these methods is an centrifugal pump, one skilled in the art will immediately understand that the scope of the invention is not intended to be limited to such pumps, pumps in general, control valves, or any other type of equipment specifically identified herein.

Referring to FIG. 1, we see an arrangement 10 commonly found in a refinery or other kinds of processing centers. Arrangement 10 comprises a tower 12 and a receiving vessel 14. Tower 12 has a number of trays 13 which are used as part of the refining process. A hydrocarbon "crude" mixture is introduced into the tower, and condenses into the trays. Each tray is arranged such that it will receive a particular product that is a component of the original crude mixture. Sometimes gravity alone may be used to take the product from tower 12 to a containment vessel 14, e.g., a drum, for holding purposes. Usually, however, as may be seen in FIG. 1, a pump 16 is used to deliver the product.

The normal flow direction through the pump, when in service, is represented by an arrow 27 in the figure. This pump is the dynamic device that is to be cleaned in this embodiment of the invention. More specifically, pump 14 is an centrifugal pump. The process of the present invention is not limited to the cleaning of this type of component, however. It will work equally well for cleaning other types of dynamic devices in a refinery. For example, it could also be used to clean control valves. Control valves are often used between devices in a refinery to control relative rates of flow between vessels. Compressors would be another example. There will be other numerous devices in a refinery which are dynamic—have some moving parts—for which this process could be used that will become apparent to one skilled in the art upon review of this process.

This is also true for the other FIG. 1 vessels. Though a tower 12 (also called a column), and containment vessel 14 have been selected as the FIG. 1 components in order to make the processes more understandable, it should be recognized that the present invention is not limited in scope to such an arrangement. Other components may be substituted. For example, either of these components might be holding tanks, boilers, or other types of vessels.

During normal operation, referring to the FIG. 1, product is withdrawn from one tray in the column from an exit port 21 through a pipe 20 into the suction port 26 of the pump 16. Once in pump 16, the product is acted on by the impellers and driven through pipe 18 from discharge port 24 into containment vessel 14 for holding purposes. Pipes 18 and 20 may be any kind of conduit having any size. Pipe 18 has an isolation valve 22 disposed therein which is normally open, but may be closed in order to block the discharge end 24 of pump 16 in a manner that will be described later. Pipe 20 also has such a valve 52 which may be used to block in the suction side 26 of pump 16. When pump 16 is operating, product will thus be delivered from column 12 to container 14.

Over time, pump 16 will become contaminated with hydrocarbons. These hydrocarbons will be removed using the process of the present invention.

Next, the device to be cleaned is emptied of free flowing heavy organic solids. The device is completely emptied by draining it. Referring to FIG. 1, this might be done by opening valve 30,d which is the lowest bleeder in the blocked section, to eliminate all the processing fluids therein. It might also be done by a vacuum process, steaming, or processes using liquid nitrogen.

First, the dynamic device (e.g., pump 16) is blocked or blinded in by closing off all incoming and outgoing fluid valves in a manner known to those skilled in the art. Referring to the FIG. 1 embodiment, this means simply shutting valve 22 and valve 52.

A bleeder valve 28 which is tapped into pipe 18 is used to gain access to the system 10 for the purpose of injecting steam and cleaner. It is important to note, however, that refinery arrangements like that disclosed in FIG. 1 also typically have other means of access (e.g., pressure gauge connections) which may work equally as well. The only critical need is that some form of obtaining fluid access is selected. One skilled in the art will recognize that numerous means of access could be used equally well, and that the scope of the invention is not intended to be limited to those specifically identified herein.

Later in the process, cleaner will be administered into the access point bleeder valve 28 by joining the source of refinery steam sources with corresponding sources of cleaner.

A source of steam 42 is normally obtained from preexisting steam lines in the plant. The lines selected should have steam temperatures of at least 330 degrees Fahrenheit. Ideally, the line temperatures should be between about 350 to 450 degrees Fahrenheit. The typical 150 psig refinery steam line will work effectively, however, super-heated 40 psig steam lines, which deliver steam at temperatures in excess of 400 degrees Fahrenheit, may be used as well.

Cleaner, the composition of which is described above, is pumped from a source 48. Sometimes a drum of chemical. Sometimes a small container.

Figure 2:
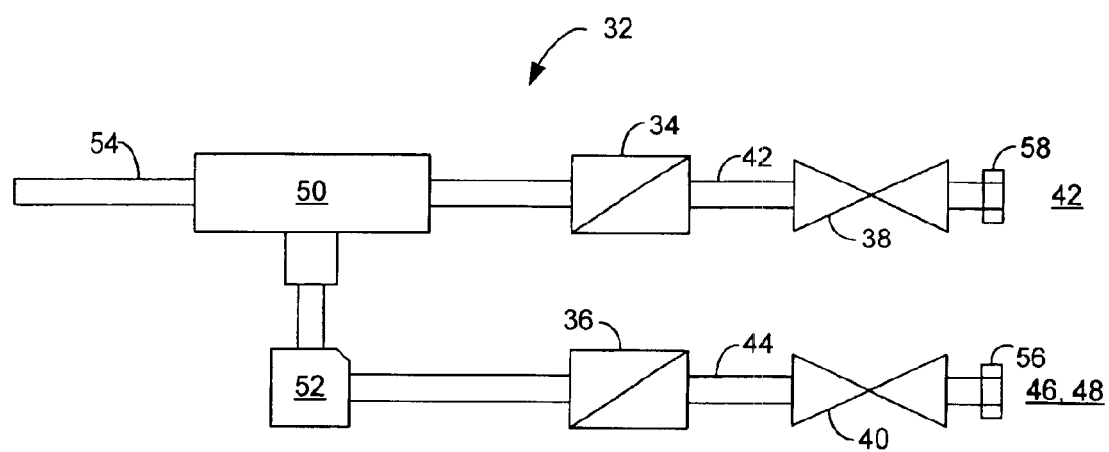
FIG. 2 is a schematic showing the cleaner administrator of the present invention.

The administration of both steam and cleaner are accomplished using an administrator 32. The details regarding administrator 32 of the present invention are shown in FIG. 2. FIG. 2 discloses that steam 42 and cleaner 48 sources are joined at a T-junction 50. Such T-junctions are standard plumbing, and acceptable embodiments are readily available to one skilled in the art. The refinery steam hose (not shown) selected as steam source 42 for use in the cleaning process is attached to steam conduit using a standard connector 58. Conduit 42 transmits the steam under pressure to a first side of junction 50. Between steam source 42 and junction 50 on conduit 42, a valve 38 serves to either open or shut off the source of steam 42 after the hose is attached to connector 58. Immediately downstream, a check valve 34 allows flow in the downstream direction only. This prevents back flow of cleaning chemical or effluent into the steam source.

Interposed on conduit 44 between cleaner source 48 and junction 50 are cleaner valve 40 and check valve 36. Valve 40 is used to either allow or shut off the flow of cleaner from source 48. Check valve 36 allows flow in the downstream only to prevent the back flow of steam into the cleaner container. A standard elbow 52 is used to converge conduits 42 and 44 into junction 50. After steam and cleaner conduits, 42 and 44 respectively, meet up at junction 50, their collective flows are converged into a common line 54, shown in FIG. 2. Common line 54 is used to tap the administrator into valve 28 in a manner that will be within the knowledge of those skilled in the art. As already stated, other points of access could be used as well.

This valved-T-junction arrangement enables the user to optionally: (i) introduce neither steam, nor cleaner; (ii) introduce only steam; or (iii) introduce steam and vaporized cleaner into a desired access point on the column. Cleaner is administered using a pneumatic barrel pump 46 (see FIG. 1) which is attached to connector 48 on cleaner conduit 44 (See FIG. 2). Alternatively, pump 46 could be a steam siphon. The cleaner is initially in liquid form, however, when it reaches T-fitting 50, it is immediately aspirated and vaporized and administered to the vessel in vaporous form.

Though the device 16 in FIG. 1 is shown as being cleaned using only one administrator, it should be noted that additional administrators could also be tapped into the discharge side of pump 16 for the delivery of steam and cleaner.

The process of the present invention also provides that the steam, cleaner, and resulting effluent be vented. After being delivered into pipe 18 at valve 28 by administrator 32, the steam (or steam plus cleaner) will enter the discharge side 24 of the pump and exit the suction side 26. The effluent, which results from the steam and cleaner introduced into device 16, herein, is vented to column 12. With this arrangement, valve 52 is open and bleeder 30 closed. Alternatively, the effluent could be vented to another column, the atmosphere, or a containment vessel. This could e done through valve 30 or some other access point.

Valve 30 may be used to drain pump 16. It also may be used vent effluent during the cleaning process. The most common method of venting is to column 12, though. Alternatively, valve 30 could be used to vent to another column, the atmosphere, the flare, or a containment vessel, none of which are shown in FIG. 1. Whatever the arrangement, it should be consistent with a predetermined plan devised for dealing with the vented effluent. It is important that this particular plan complies with all state and local regulations. This can be done by any number of methods. One skilled in the art will realize that other methods of managing the effluent are possible and are to be considered within the scope of the present invention.

It will be noted that the preferred reverse-delivery embodiment of this invention—which involves administering steam and cleaner in the direction opposite that in which product is pumped when the pump is in service—has been shown to clean the pump more effectively than when the steam and cleaner are delivered in the same direction of normal product flow. One advantage to this is that most contaminants will tend to be on the back of actual surfaces in the flow path. The metal surfaces in front will tend to be cleaned off by the constant barrage of flowing product during normal operation.

One skilled in the art will recognize, however, that it would also be possible to use the methods of the present invention to clean the pump by hooking up administrator 32 at some point on the suction side of the pump. With this alternative technique, steam and cleaner would be delivered through suction side 26 of pump 24 in a direction that is the same as the flow of product when the pump is in service. Though this alternative delivery method is within the scope of the present invention, it has been observed, however, that it is less effective than the reverse delivery method which comprises the preferred embodiment disclosed in FIGS. 1 and 2.

Once the administration and venting arrangements have been made as shown above, the pump is then preheated. This is done by injecting only steam from administrator 32 through valve 28 into pipe 18 and in through the discharge port 24 of pump 16. Pump 16 should be continually vented throughout this preheating process. Again, the steam delivered should have temperatures of at about 330 degrees Fahrenheit. The injected steam increases internal temperatures within the pump. These internal temperatures should be increased until they exceed 225 degrees Fahrenheit. Since this steam preheating and the subsequent injection process are both carried out at substantially atmospheric pressure while venting, it is important for the production facility to have a plan in effect for managing the vaporous, vented effluent as mentioned earlier. Though no cleaner has been used up to this point, the steaming/preheating process alone will cause the vaporous removal of some hydrocarbon product and contaminants to be vented out of the pump according to the plan selected prior thereto.

In addition to the impurities removed in the vaporous effluent, some condensed water mixed with contaminants will be created in pump 16. In order to remove this mixture after the pump has reached the 225 degree temperature, the steam is temporarily turned off so that the hydrocarbon-laced condensate may be drained. Because draining the device may cause it to cool slightly, the steam should then be reactivated until the device reaches 225 degrees.

Once the device has been preheated as so, it is time to inject the cleaning chemical into the already running steam. The amount of cleaner necessary is dependent on the total enclosed volume of the vessel and the nature and volume of contaminate as explained above.

After preheating process has been completed and the appropriate amount of cleaner selected, it is time to begin the administration of cleaner. To begin this process, cleaner is pumped from container 48 by barrel pump 46 and then delivered to the point of access using an administrator 32 (shown in FIG. 2). In this case, the point of access is shown to be a bleeder valve connection 28.

Upon introduction to the system, the cleaner will be instantly vaporized by the column of steam at junction 50. The steam then carries the vaporized cleaning agent into pipe 18, and then into pump 16.

The most common method of venting is to column 12. Alternatively, valve 30 could be used to vent to another column, the atmosphere, the flare, or a containment vessel, none of which are shown in FIG. 1. Whatever the arrangement, it should be consistent with a predetermined plan devised for dealing with the vented effluent. Again, this will likely be done by venting through column 12. Alternatively, however, the effluent could be vented to another column, the atmosphere, the flare, or a containment vessel.

Once the vaporized cleaning chemical enters into dynamic device 16, at least three distinct cleaning actions take place simultaneously. First, the vaporous cleaning agent solublizes the light end hydrocarbons (benzene, $H_2S$, LEL, etc.) that are present on the inside of the device. Once solubilized by the vaporous cleaning agent, these light end materials are carried out of the device in vaporous form through the ventilation process. The vapors coming out of the vent should be handled in accord with the plan set forth in advance.

The second cleaning action is more gradual. Due to the partial pressures of cleaning agent, some of its vapors will recondense into liquid upon contacting the cooler metal surfaces inside the device. These metal surfaces are usually heavily coated with petroleum residues and processing fluids. The kinetic energy generated when portions of the cleaning agent's vapors condense onto these metal surfaces (the transformation from a vapor phase to a liquid phase releases energy), along with the tremendous solvency strength of the formulation, allows the petroleum contaminants to be dissolved away from the metal surfaces inside the vessel. Once removed, these contaminants become detached from the metal and drip to the bottom of the device.

A third cleaning action is of a physical nature. This involves the dynamics of having the steam and cleaner move through the system. These properties tend to cause the contaminants to be removed. Because the flow of steam plus cleaner is directed opposite the normal direction in which the device is operated, the physical blasting tends to hit the areas not worn away by the flow of fluids. Activation of the device will further assist in the removal of contaminants.

At some time during the administration of the cleaner into the device, the device should be activated for a period of time. In the case where dynamic device 16 is a centrifugal pump, the period of activation should only be about 30 seconds or as defined by the pump manufacturer. This is because to do so longer might potentially cause damage. During normal operation, components of the pump (especially seal and bearing surfaces) are lubricated b the process fluid. When the process fluid is removed (as it is during the process of the present invention) lubrication to wearing surface is lost and damage to the pump may result from extended operation.

The agitation of the dynamic device significantly aids in the cleaning process. The movement of the impellers helps remove contaminants that have been loosed by the already introduced cleaner. Especially contaminants which might interpose themselves between moving and other parts within the device. The presence of contaminants in the area of wear rings, bushings, seals, casing, and other places may defeat the desired operation goals for pump by impeding the function of the impeller. These impeding contaminants, however, are also less likely to receive the an adequate amount of cleaner without a temporary agitation. Thus, this agitation step helps not only to dynamically remove contaminants, but also allows cleaner to be worked into contaminants which have developed in tight spots that would be difficult to reach by just passing vaporous steam plus cleaner through the device. It simultaneously shakes off some contaminants, while working cleaner into other ones.

After the cleaner has been administered, steam should continue to be injected through administrator 32 for a dwell time of about 10 minutes. This dwell cycle allows the contaminants to further dissolve via continuous re-vaporization of the condensed cleaner. It is also necessary to substantially remote the cleaning agent from the system before returning it to service.

After the dwell cycle, the steam injection is stopped, valve 30 (or other means to drain device 16) is opened to drain to a post-processing or containment system. When the pump is drained, liquid effluent comprising contaminate and residual cleaning agent is removed. The liquid effluent may be removed by carrying it out of the vessel directly to slop tanks. Once in the slop tanks, the effluent is easily post processed. The post processing is made easy because the cleaning agent is all natural, and thus, biodegradable.

The effluent might also be passed directly through the post-processing equipment in the refinery, where it will be refined in the normal course of production. Because the cleaning agent included in the drained effluent is a naturally occurring hydrocarbon which does not contain any chelating agents, phosphates, silicates, or any chemicals that would cause problems with treatment facilities, it may be easily re-refined without harming the facility's equipment.

The cleaned dynamic device, its contaminants removed, will now operate at maximum efficiency, and vibrations brought under control.

Thus, there has been shown and described a method for cleaning a dynamic device in a refinery which fulfills all of the objects and advantages sought therefore. Many changes, modifications, variations, and other uses and applications of the subject invention will, however, become apparent to those skilled in the art after considering this specification together with the accompanying figures and claims. The same process, together with ensuring benefits are also applicable to similar equipment in unrelated industries (such as oil production, sugar, pulp and paper) where organic contaminants must be removed from process equipment so as to improve operating efficiencies. All such changes, modifications, variations and other uses and applications which do not depart from the spirit and scope of the invention are deemed to be covered by the invention which is limited only by the claims which follow.

What the invention claimed is:

1. A method of cleaning a dynamic device, comprising the steps of:

providing a steam source;

providing a surfactant source;

providing a solvent source;

delivering steam from said steam source to said device;

introducing terpene from said solvent source into the steam delivered to the device;

introducing a surfactant from said surfactant source into the steam delivered to the device;

removing hydrocarbon contaminants out of said device while said hydrocarbon contaminants are in a vaporized form as the steam, the surfactant, and terpene are delivered to said device; and activating the device for a period of time when said steam, terpene, and said surfactant are being delivered to said device.

2. The method of claim 1 including the additional step of preheating the device said steam prior to the introduction of said terpene and said surfactant.

3. The method of claim 1 wherein the surfactant comprises a linear alcohol ethoxylate (C12–C15) with an ethoxylated propoxylated end cap and a fatty alkanolamide.

4. The method of claim 1 wherein said surfactant comprises at least one of nonylphenol polyethoxylate, a straight chain linear alcohol ethoxylate, a linear alcohol ethoxylate with block copolymers of ethylene and propylene oxide, and diethanolamine.

5. The method of claim 1 wherein said terpene is a monocyclic saturated terpene.

6. The method of claim 1 wherein said terpene is a monocyclic unsaturated isoprenoid.

7. The method of claim 1 wherein said terpene is a bicyclic pine terpene.

8. The method of claim 1 wherein the surfactant and terpene are introduced into said steam by joining said steam, surfactant, and solvent sources.

9. The method of claim 1 wherein said device is a pump.

10. The method of claim 1 wherein said device is identified for maintenance by monitoring vibrational levels of said device.

11. The method of claim 1, wherein said hydrocarbon contaminants are removed from metal surfaces of said dynamic device.

12. The method of claim 1, wherein said dynamic device is equipment used in a refinery.

13. The method of claim 1, further comprising directing said steam, terpene, and said surfactant through the device in a direction opposite to the flow of processing fluids previously present in said device.

14. The method of claim 5 wherein said terpene is para-menthane.

15. The method of claim 8 wherein said joining is accomplished using a T-fitting.

* * * * *